(12) United States Patent
Schweiggart et al.

(10) Patent No.: US 7,972,708 B2
(45) Date of Patent: Jul. 5, 2011

(54) HEAT SHIELD

(75) Inventors: Franz Schweiggart, Pfaffenhofen (DE); Thomas Dietrich-Radt, Bibertal (DE); Alexander Gloeggler, Tomerdingen (DE)

(73) Assignee: Dana Automotive Systems Group, LLC, Maumee, OH (US)

( * ) Notice: Subject to any disclaimer, the term of this patent is extended or adjusted under 35 U.S.C. 154(b) by 438 days.

(21) Appl. No.: 12/220,568

(22) Filed: Jul. 25, 2008

(65) Prior Publication Data
US 2009/0075041 A1 Mar. 19, 2009

(30) Foreign Application Priority Data
Jul. 26, 2007 (EP) .................................... 07014703

(51) Int. Cl.
*F01N 13/00* (2010.01)
*F02B 77/11* (2006.01)
*B60R 13/08* (2006.01)
(52) U.S. Cl. .................... 428/604; 181/284; 428/603
(58) Field of Classification Search .............. 428/604
See application file for complete search history.

(56) References Cited

U.S. PATENT DOCUMENTS

| | | | | |
|---|---|---|---|---|
| 2,391,997 A * | 1/1946 | Noble | ............... | 52/578 |
| 3,171,517 A * | 3/1965 | Howell | ............... | 52/86 |
| 4,348,442 A * | 9/1982 | Figge | ............... | 428/72 |
| 4,856,175 A * | 8/1989 | Swensen et al. | ............... | 29/460 |
| 5,124,191 A * | 6/1992 | Seksaria | ............... | 428/178 |
| 5,196,253 A * | 3/1993 | Mueller et al. | ............... | 428/138 |
| 5,800,905 A * | 9/1998 | Sheridan et al. | ............... | 428/157 |
| 5,981,082 A * | 11/1999 | Pirchl | ............... | 428/603 |
| 6,004,652 A * | 12/1999 | Clark | ............... | 428/133 |
| 6,451,447 B1* | 9/2002 | Ragland et al. | ............... | 428/593 |
| 2006/0194025 A1* | 8/2006 | Oxenknecht | ............... | 428/174 |
| 2007/0122568 A1* | 5/2007 | Blomeling | ............... | 428/31 |
| 2009/0029139 A1* | 1/2009 | Schweiggart et al. | ............... | 428/220 |

FOREIGN PATENT DOCUMENTS

| | | | |
|---|---|---|---|
| DE | 4035177 | * | 5/1992 |
| DE | 19849366 | | 4/2000 |
| DE | 299 24 102 U1 | | 11/2001 |
| EP | 0382459 | * | 8/1990 |
| EP | 1 775 437 A1 | | 4/2007 |
| WO | WO 0046493 | | 8/2000 |
| WO | WO 2004098808 | | 11/2004 |

* cited by examiner

*Primary Examiner* — John J Zimmerman
(74) *Attorney, Agent, or Firm* — Marshall & Melhorn, LLC

(57) ABSTRACT

A heat shield for shielding an object against heat and/or noise has at least one metal layer having a first and a second surface, beyond at least one of which a plurality of embossments projects. At least a part of the embossments differ from the remaining embossments in their size.

18 Claims, 5 Drawing Sheets

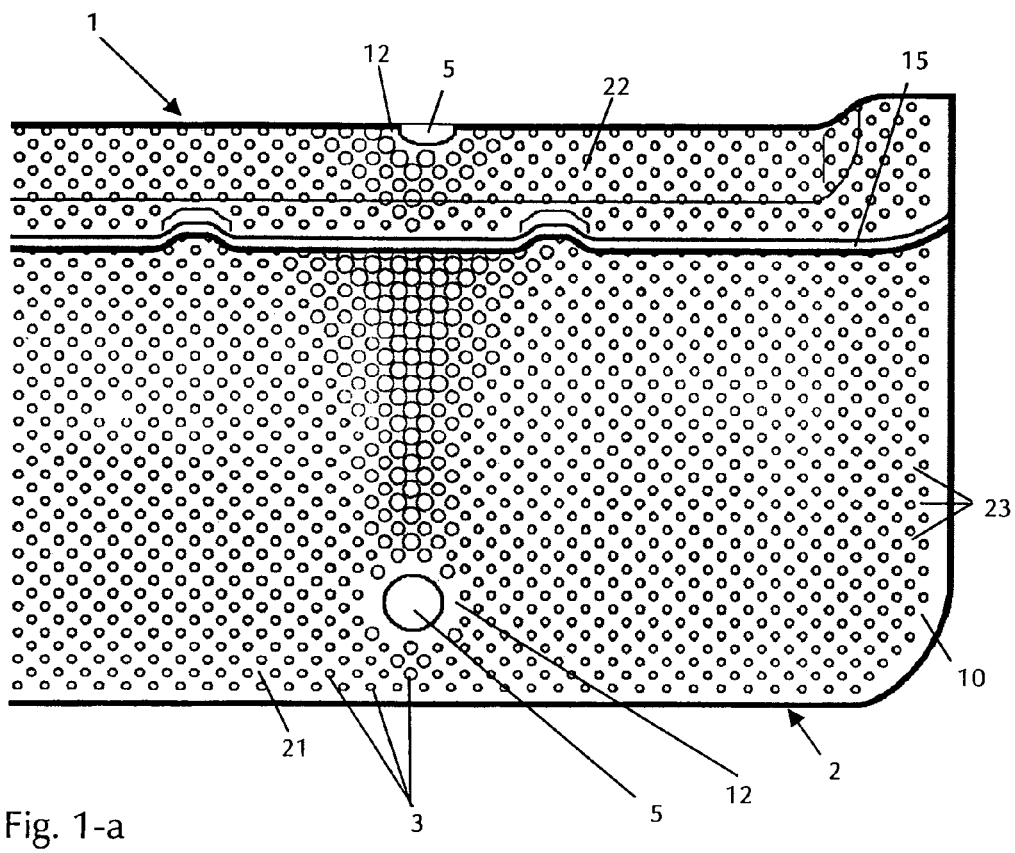
Fig. 1-a

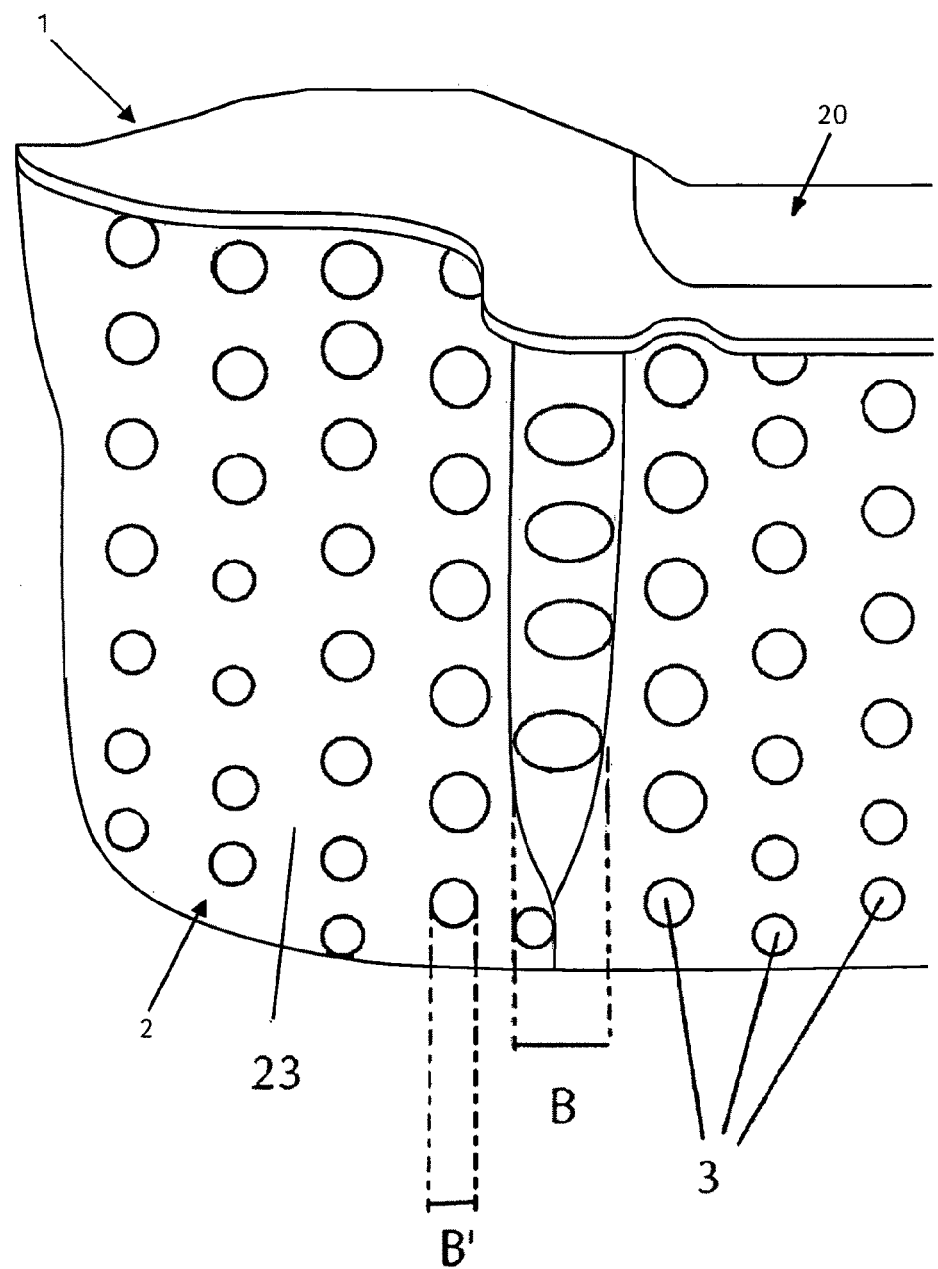
Fig. 1-b

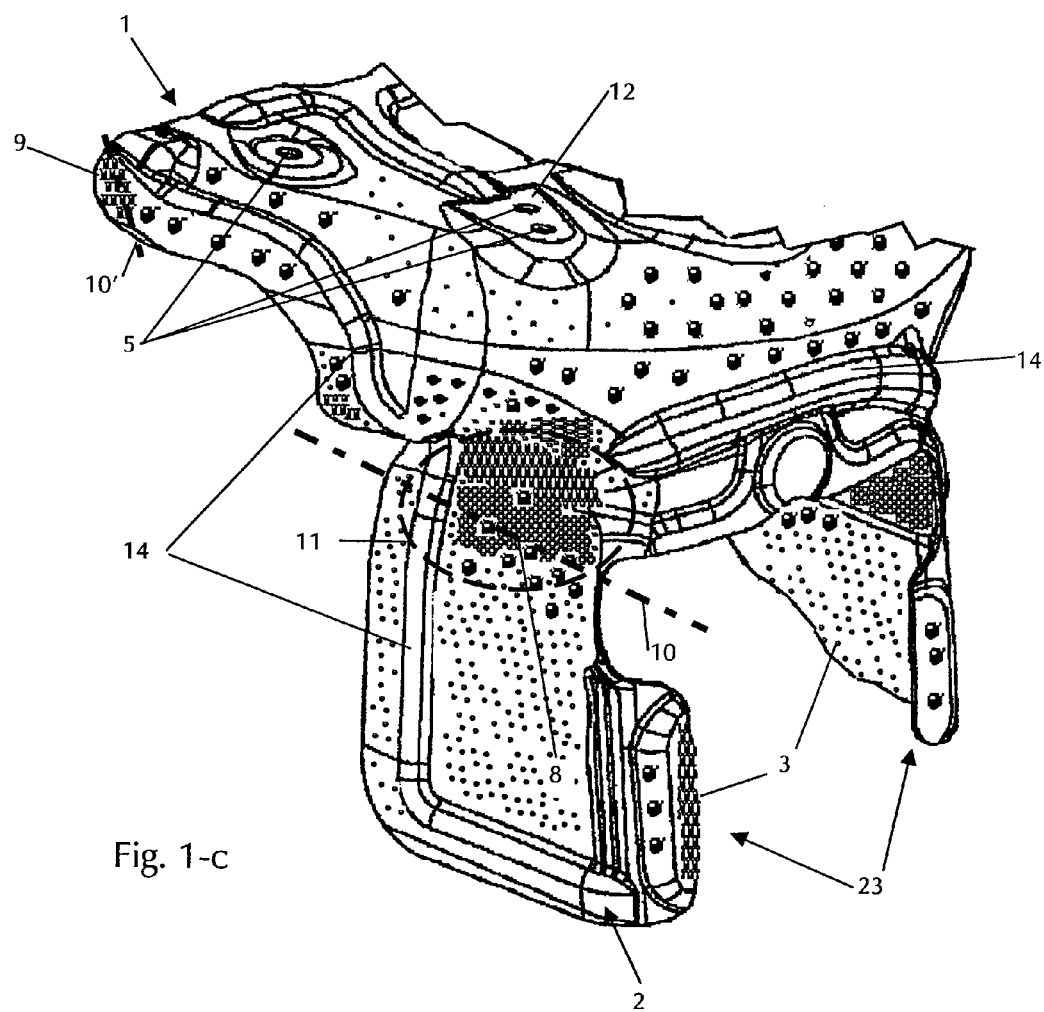
Fig. 1-c

Fig. 4
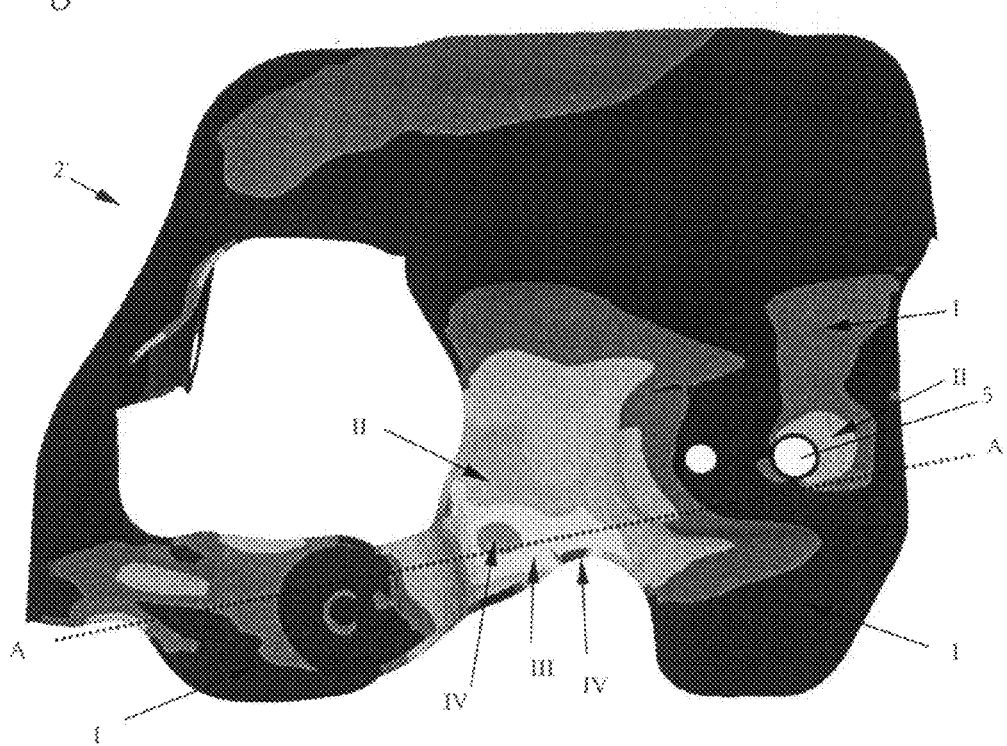
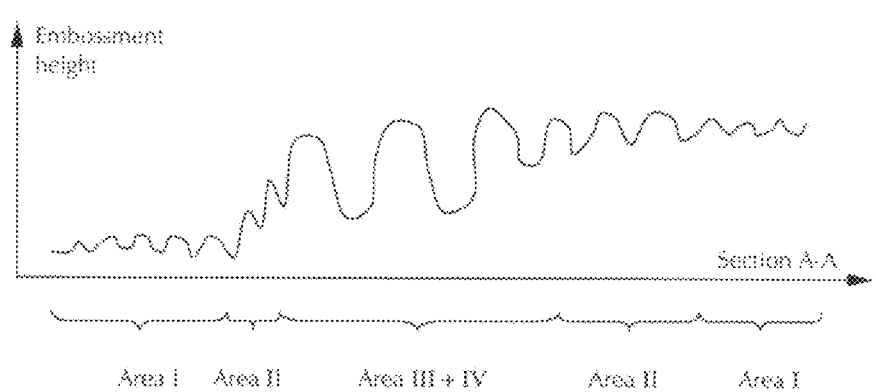
Fig. 5

US 7,972,708 B2

HEAT SHIELD

BACKGROUND OF THE INVENTION

The invention relates to a heat shield for shielding an object against heat and/or noise, which has at least one metal layer, with embossments projecting beyond at least one of the surfaces thereof.

Heat shields of this type are used as noise and/or heat protectors for other components. Heat shields are used, for example, in engine compartments of motor vehicles, in particular in the area of the exhaust system, to protect adjacent temperature-sensitive components and assemblies from excessive heating. The heat shields are often used simultaneously as a noise absorber.

To be able to absorb noise and shield heat to a sufficient extent, heat shields of this type frequently have an at least three-layered structure. The two cover layers typically comprise metal, in particular steel, aluminum-plated steel, or aluminum (alloy). A nonmetallic insulation layer is embedded between the cover layers. It comprises, for example, mica or vermiculite, temperature-resistant cardboard, inorganic or organic fiber composite materials, or other suitable insulation materials such as fabrics, knitted fabrics, and/or warp made of temperature-resistant fibers. The nonmetallic inlays cause increased effort in regard to the recycling of the heat shields and are therefore often undesirable.

Heat shields are also known which entirely comprise metal and do not have a nonmetallic insulation layer. The metal layers are often shaped in such a way that a resonance chamber is formed between them, in which noise may be absorbed. The air layer enclosed between the metal layers is simultaneously used as the insulation layer against heat. The resonance chambers are formed, for example, in that embossments or ribs are shaped into one or both metal layers, which project in the direction toward the respective other metal layer. In addition, shaping ribs or embossments into the metal layers of heat shields for stiffening is known.

As a function of the particular application, especially the space available, heat shields often have a strong three-dimensional conformation which may result in tensions in the heat shield. Because of the vibrations during operation, the heat shields may be damaged in the high-tension sections in particular and form cracks which often crack further upon continuing operation, because the heat shields are to be designed as thin as possible—also in regard to saving material and weight. Upon the three-dimensional deformation of the heat shields, strong, often non-reproducible wrinkling additionally occurs, which negatively influences the reflection properties of the heat shield surface. Moreover, cracks may already occur in very strongly deformed areas during the manufacturing upon the three-dimensional deformation of the heat shield from a planar basic shape, which make the heat shield unusable from the beginning.

Stiffening ribs or embossments may—as noted—help to achieve the required rigidity of the metal layers. In the case of embossments, distributing them uniformly and of equal size over the metal layer is known. The protective effect and stability of the heat shield is thus improved, but the problems cited in the preceding paragraph are not always reliably remedied in this way. An especially high degree of deformation actually occurs particularly in the area of the embossments, which results in an increased danger of cracking or, vice versa, requires the use of higher material thicknesses, which has negative effects in regard to cost and weight, however. To avoid cracking in any case, the embossments may also be implemented relatively small. However, the desired stiffening of the metal layer may then often not be achieved, and the noise absorption properties are also not optimal.

There is therefore a need for a heat shield which, with the lowest possible material consumption and weight, is nonetheless as stable as possible, does not tend toward cracking, and offers good noise and heat protection. Furthermore, uncontrolled wrinkling is to be avoided. The object of the invention is accordingly to specify a heat shield which does not have the above disadvantages.

SUMMARY OF THE INVENTION

This object is achieved by a heat shield for shielding an object against heat and/or noise having at least one metal layer having a first and a second surface, beyond at least one of which a plurality of embossments projects, wherein at least a part of the embossments differ from the remaining embossments in their size.

BRIEF DESCRIPTION OF THE DRAWINGS

The invention is explained in greater detail hereafter on the basis of drawings. The drawings are used exclusively to illustrate preferred exemplary embodiments of the invention, without the invention being restricted thereto. Identical parts are provided with identical reference numerals in the drawings.

In the schematic figures:

FIG. 4 shows a perspective view of a three-dimensionally deformed metal layer before shaping of embossments to illustrate the local bending stress, and FIG. 5 shows a graph of the embossment height as a function of the bending stress in the area of line A-A of FIG. 4.

DETAILED DESCRIPTION OF THE INVENTION

Figure 1:
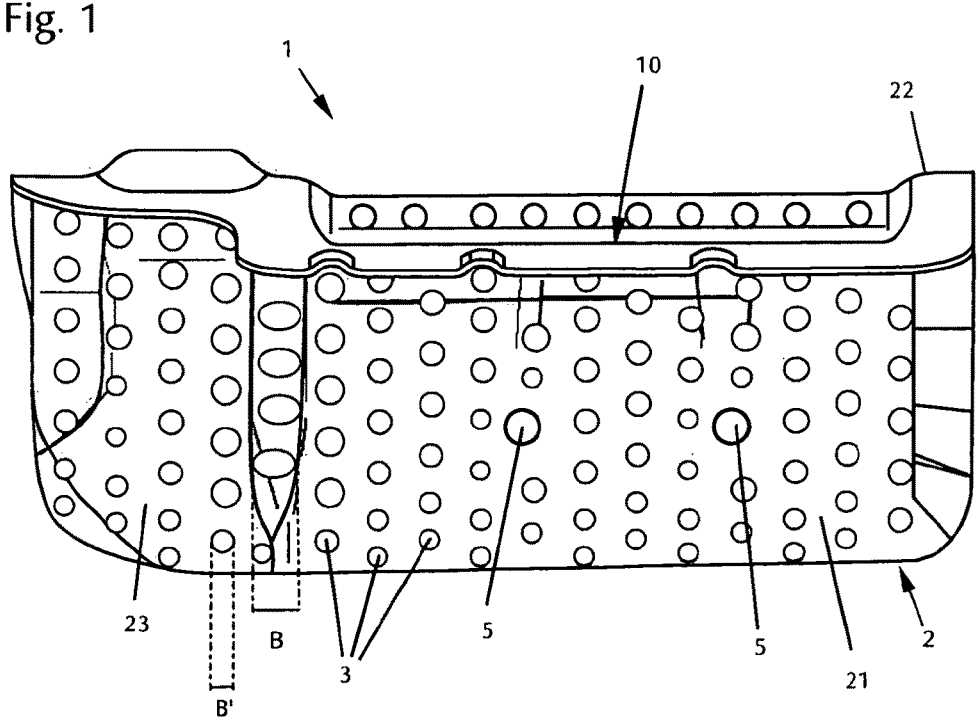
FIG. 1 (FIG. 1-a, FIG. 1-b, FIG. 1-c) shows, in three partial FIGS. 1-a through 1-c, details of a perspective view of a heat shield according to the invention in various embodiments.

The invention thus relates to a heat shield for shielding an object against heat and/or noise having at least one metal layer having a first and a second surface, a plurality of embossments projecting beyond at least one of these surfaces. According to the invention, at least a part of the embossments differ from the remaining embossments in their size. The size and distribution of the embossments does not have a pattern relationship viewed over the entire heat shield. The invention is based on the main idea of adapting the size of the embossments over the area of the metal layer and therefore their section modulus against bending to the particular local strain of the metal layer to be expected. The embossment size is ideally selected for each of the embossments in such a way that their section modulus is just sufficient to resist the bending stress to be expected at the location of the embossment. The embossment is thus only precisely as large as necessary in each case. The degree of deformation of the metal layer in which the embossment is shaped is thus also not greater than absolutely necessary. Unnecessary strain of the metal layer is thus avoided. The danger of cracking decreases simultaneously.

Using a metal layer into which differently sized embossments are introduced distributed over its area, whose size is adapted exactly to the local bending stress to be expected, not only is optimum rigidity achieved at lower material thickness, but rather also the noise propagation and noise dissipation to the surroundings of the heat shield is significantly reduced. The increased rigidity of the metal layer causes reduced oscillation on its surface, a shift of the natural frequency range of the heat shield, and thus reduced noise.

In principle, the larger the embossment, the greater its section modulus. The height of the embossment has special significance. The section modulus of an embossment results as $\frac{1}{12} B*H^2$, B referring to the embossment width and H to its height. The square of the height of the embossment thus contributes to the increase of the section modulus. For this reason, varying the heights of the embossments to set the desired section modulus of the embossments is especially preferred. However, this does not preclude the embossment size being changed alternatively or additionally in another way. For example, the embossment width or the area extension of the embossments may also be varied. The embossment width is measured as the distance between the embossment bases, which are the points of the embossment at which the slope of the embossment flanks is at zero and at which the embossment begins to rise out of the surface of the metal layer into which it is shaped. The embossment width is the maximum possible distance between diametrically opposite embossment bases here. The embossment height is the distance between embossment base and embossment apex, the maximum distance being used for the case in which all embossment base points do not lie in one plane. The area extension of the embossment is the area delimited by the embossment base points, projected in the plane of the metal layer, if the embossment base points do not lie in the plane of the metal layer in any case.

The section modulus of the embossments may additionally or alternatively also be set via the flank steepness of the embossments. The flank steepness is the angle between a tangent applied to the embossment flank and the straight line between diametrically opposite embossment bases which is intersected by the tangent. The angle is measured from the interior of the embossment in the direction toward the flank and is typically at most 90°. When determining the flank steepness, the transition areas between embossment base and flank on the one hand and embossment apex and flank on the other hand are not considered. The flank steepness is expediently determined using a tangent which is applied to the embossment flank at half the height between embossment base and embossment apex. The section modulus of the embossment increases with increasing flank steepness.

The shape of the embossments is fundamentally arbitrary. Round or rounded embossments are especially easy to produce. However, polygonal shapes are also conceivable. Circular or oval shapes are especially preferred. All shapes may also be used combined with one another on a metal layer. For embossments which have a shape which is not point-symmetric, it is additionally possible to achieve a directionally-dependent variation of the properties of the metal layer. For example, a higher rigidity in the longitudinal direction than in the width direction may be obtained by embossments which have a greater length than width. Asymmetrical embossments of this type are preferably situated in the areas of very high bending stress. The longitudinal axis of the embossment expediently corresponds with the direction of the lever of the bending stress.

The embossments may project beyond only one of the surfaces of the metal layer or beyond both surfaces. For reasons of space and for reasons of easier producibility, implementing the embossments toward only one side of the metal layer is preferred.

Especially effective stiffening of the metal layer is achieved if the embossments are distributed staggered over the area of the metal layer. The staggering is expediently performed in such a way that a straight line which is continuous over the metal layer may not be drawn in the intermediate spaces between the embossments. In practice, a continuous bending line thus does not run over the metal layer, at which the metal layer may be easily deformed. In this way, especially good stiffening is therefore possible.

In practice, the embossment size is established as a function of the local bending stress in the metal layer in such a way that the limit tension of the metal layer is not exceeded. The limit tension is the tension at which cracks still just do not occur under bending load in the metal. The limit tension is a function of the type of the starting material used. Concretely, it is a material constant of the metal sheet used for the production of the metal layer, namely its tensile strength. The value of the tensile strength of the planar starting sheet which has not yet been three-dimensionally deformed is used as the limit tension. Because the section modulus of the material increases due to three-dimensional deformation, the limit tension of the non-deformed starting material is less in any case than that of the deformed material and is thus also reliably usable as the limiting value of the three-dimensionally deformed material.

To determine the particular limit tension for the various areas of the metal layer, the following procedure is expediently used: The intended use of the heat shield, the type of its fastening, and the bending load to be expected in this installation situation are fundamentally known or may be at least approximately estimated. A three-dimensional deformation of the heat shield resulting from the installation situation is assumed, in which the metal layer has a constant thickness and in which embossments are not yet present in the metal layer. The bending stress resulting from the oscillation excitation is calculated for this theoretical three-dimensionally deformed heat shield, the finite element method being able to be used, for example. This bending stress may be calculated either for the entire surface of the heat shield or only for individual, specifically selected points or areas of the surface. In the latter case, the computing effort may be reduced.

An area pattern of the distribution of the bending stress over the heat shield results from the calculation. Areas of especially high bending stress may also be recognized in this way, which are to be reinforced by one or more stiffening embossments. On the one hand, the suitable location for the application of the embossments over the area of the heat shield and on the other hand the suitable shape of these embossments, i.e., their height, area extension, width, and/or flank steepness thus results from this area pattern. The latter are fixed so that they are adapted to the ascertained bending stress in a particular area. Height, width, area extension, and flank steepness of the embossments are designed in such a way that a resistance value results for the embossments which is large enough to resist the bending stress determined and compensate for the deflection by the oscillation introduced. The embossments are subsequently shaped into the metal layer on the basis of these determined values. This is however preferably performed jointly with the three-dimensional shaping of the metal layer. Thus, the three-dimensionally shaped heat shield used for the calculation without embossed embossments is, as already noted, a purely theoretical construct and is only used for ascertaining the embossment size and the distribution of the embossments in the heat shield according to the invention.

In the described calculation of the embossment size, the bending stress to be expected in the installed state of the heat shield is used as the basis of calculation. The bending stress is known to result from a quotient of bending moment and resistance value. The resistance value is determined by the construction and shape of the heat shield. Bending moment and bending stress are proportional to one another. Because of this, instead of the bending stress, the bending moment may also be entered in the calculation. Both types of calculation are therefore to be viewed as fundamentally equivalent.

According to the invention, the beam theory is preferably used as a basis when estimating the bending stress which acts on the three-dimensionally deformed heat shield. On the basis of the beam theory—as is fundamentally typical in design and strength teaching—the carrying capacity of the heat shield may be estimated here with the aid of the calculation for a bending moment acting on a bending beam. The load situation of the installed heat shield is simulated, and the heat shield is stiffened by embossments starting from this estimation in such a way that the maximum carrying capacity to be expected is not reached. The calculation according to the bending beam method is used for ascertaining this limit tension—the maximum possible bending stress in the heat shield which does not result in undesired deformations, cracking, etc. The greater the bending moment, the greater must the resistance value of the heat shield be at this point, so that the limit tension is not reached. On the basis of this method it is thus possible, in addition to the optimum location of the embossments, to also establish their height, width, area extension, and flank steepness in such a way that they are just sufficient to resist the bending stress to be expected. Overdimensioning of the embossments and thus unnecessary reshaping of the starting material may be avoided in this way.

As described above, the oscillation excitation which results in a bending moment acting on the heat shield is entered in the estimation of the bending stress. According to the first-order beam theory, only a force acting perpendicular to the beam longitudinal axis is considered. In addition to the bending moment to be expected, torsion tensions, vibrations, or thermal loads may theoretically also be considered. However, this is not preferable because of the significantly increased computing effort.

It has resulted from the calculations according to the above method for most heat shields that embossments are expediently shaped into areas of a bending stress of 50 to 500 N/mm$^2$ and in particular of 60 to 400 N/mm$^2$. The bending stress relates to the metal layer before the introduction of the embossments. The bending stress may be reduced to 60 to 300 N/mm$^2$ by the introduction of the embossments into the metal layer.

In areas of low bending stress, placing embossments is not absolutely necessary and/or situating small embossments at large intervals is already sufficient. At some points, the stiffening because of the overall shaping of the three-dimensional heat shield, which is not restricted to a single layer in multilayer heat shields, is also sufficient. For this reason, the entire heat shield surface typically does not have embossments, it is often sufficient if 30%, preferably 40%, especially preferably at least half of the surface of the heat shield layer is covered by embossed areas. The values relate to the envelope circle of an embossed area, not to the surface component which is actually shaped out of the heat shield layer plane. Transition areas between free flaps which are only slightly deformed and a wider area which is more strongly three-dimensionally shaped or is reinforced by ribs are susceptible to bending and kinks in particular and are therefore especially reinforced by placing embossments. The embossments are seated especially closely here. Because an offset configuration using oval embossments may be implemented more easily, it is used especially frequently in these areas.

Some concrete numeric values for the dimensioning of the embossments are to be specified hereafter. The values for embossment height, diameter (width), area extension, flank steepness (flank angle), and embossment distance may each be provided alone or also in combination. For strongly loaded areas having a bending stress of 160 N/mm$^2$ to 500 N/mm$^2$, embossment heights of 2.5 to 15 mm and particularly 3 to 10 mm are preferably selected. In less strained areas having a bending stress of less than 120 N/mm$^2$, embossment heights of 1 to 8 mm, in particular 3 to 6 mm, are suitable. The area extension of one embossment lies at 50 to 1300 mm$^2$ and in particular 110 to 320 mm$^2$ with a bending stress of 160 N/mm$^2$ to 500 N/mm$^2$. An area extension of 12 to 200 mm$^2$, in particular 25 to 110 mm$^2$ is suitable with a bending stress of less than 120 N/mm$^2$. A relatively large diameter of 4 to 20 mm, in particular 6 to 10 mm, is expediently used with a bending stress of 160 N/mm$^2$ to 500 N/mm$^2$, while smaller diameters of 2 to 8 mm, in particular 3 to 6 mm, are preferred with a bending stress of less than 120 N/mm$^2$. With a moderate bending stress having values in the intermediate range of the specified values, moderate dimensions lying between the ranges are also selected. In addition, flank angles of 20 to 90°, in particular 30 to 60°, and a spacing of the embossment apices of 2.5 to 30 mm, in particular 6 to 15 mm, have proven themselves. 1 to 10, in particular 1 to 6 embossments are typically present per square centimeter of the metal layer. For oval embossments, the longitudinal extension is preferably at most three times, especially preferably at most twice, and in particular 1.5 times the transverse extension.

In the cited value ranges it may be ensured that an excessive reshaping of the starting material is avoided by introduction of the embossments. The described embossment sizes are typically achieved using a material stretching of at most 5%. Cracks in the starting material typically first occur at approximately 30% stretching. It is possible according to the invention to adapt the embossments to the pre-existing conditions in such a way that an optimum rigidity is achieved with the least possible degree of reshaping of the metal layer into which the embossments are shaped. Because of the optimized dimensions of the embossments in the heat shield according to the invention, the starting material thus has to be reshaped less strongly than was typical until now in the prior art. Unnecessary material strain and material thinning of the starting material may be prevented in this way. However, the danger of cracking both during the production of the heat shield and also in later use thereof is thus also decreased significantly. Vice versa, the material thickness for producing the heat shield may be reduced, if the formation of cracks and wrinkles in the heat shield is to be reliably prevented. This reduces the costs and the weight of the heat shield.

In addition, the embossments may also be implemented not only in consideration of the bending stress, but rather also in consideration of the thermal strain to be expected. Thus, the height of the embossments is established in particular as a function of the distance to the heat source from which the object to be shielded by the heat shield is to be protected. Expediently, the closer the surface area of the metal layer comes to the heat source, the greater the height of the embossments in this area. In this way on the one hand better stiffening is achieved to counteract the thermal weakening of the material of the metal layer, and on the other hand the layer thickness of the insulation is increased.

It is additionally advisable to design the embossments in areas having special functions in accordance with this function. For example, it may be advantageous to decrease the height of the embossments toward the outer edge of the metal layer so as not to make the connection to further layers of the heat shield more difficult in this area. Very tall embossments in the outside edge area may impair flanging the edge of one metal layer around another, for example. Excessively large, in particular excessively tall embossments may also make the fastening more difficult in the area of a fastener opening which is used for receiving a screw or the like, using which the heat shield is to be screwed onto another component. Rather short or moderately tall embossments are advantageous here. However, it is especially preferable to dispense with embossments completely in an area of 4 mm, preferably 6 mm around the fastener opening.

It may additionally be expedient to provide continuous height changes in areas between tall and short embossments, to avoid sudden changes. The embossments of moderate height are thus provided between the areas of tall and short embossments, whose height gradually approaches the heights of the adjacent embossments. This is advisable in particular if a further layer of the heat shield presses against the embossment apices.

The invention may be used on a single-layer or multilayered heat shield. In addition to metallic layers, nonmetallic insulation layers as have been typical until now in the prior art may also be used. In the case of multiple metallic layers, one, multiple, or all metal layers may have embossments of different sizes, the embossments of adjacent layers being able to point toward one another or away from one another. A preferred example is a two-layer heat shield in which only one metal layer has embossments, but the other metal layer has a microperforation. Microperforated metal layers in heat shields are fundamentally known. They typically point in the direction toward a noise source. The embossments of the embossed first metal layer preferably point in the direction toward the perforated metal layer, their apices pressing against the second metal layer. A resonance chamber thus arises between both metal layers, whose size and shape may be set by the targeted implementation of the embossments. The noise absorption properties may thus be predefined in a targeted way.

In addition, two-layer heat shields which comprise two embossed layers are also possible. The two layers preferably have different embossment placement, to thus cause even better stiffening. The two layers are preferably oriented toward one another in such a way that the embossments of the two layers do not engage in one another. Furthermore, two-layer heat shields made of one embossed layer and one layer without microstructuring are also usable.

A further example of a heat shield according to the invention is a three-layer heat shield having two metallic cover layers, which are preferably both provided with embossments in the way described, and a middle layer made of nonmetallic insulation material. The embossments preferably point toward the interior of the heat shield.

The materials typical in the prior art may be used as materials for the heat shield according to the invention. For example, the at least one metallic layer comprises steel, aluminum-plated steel, or aluminum (alloys). Hot-dip aluminized steel is especially widely distributed. Stainless steels are preferred for areas of use having a risk of corrosion and higher temperature strain, nickel-rich steels for high-temperature applications. Aluminum-plated steel has special reflection properties. Sheets for deep drawing having hot-dip aluminum plating are preferred among the cited materials. The at least one metal layer of the heat shield typically has a thickness from 0.1 to 2 mm, preferably 0.2 to 1.5 mm. With more than one metal layer, it is a function of the particular application whether equal sheet thicknesses or different sheet thicknesses are selected for both layers. The individual sheet thicknesses are selected as a function of the elasticity required for the three-dimensional shaping and the rigidity required for the deformed component in such a way that cracking is avoided in the finished part under usage conditions.

The embossments are preferably embossed in the metal layer. This may be performed simultaneously with the three-dimensional shaping of the heat shield into its final shape or in a separate step. If an alteration of the embossments is to be expected through subsequent three-dimensional alteration, this may be taken into consideration beforehand in the design of the embossments. The embossments may thus, for example, be designed taller than necessary to compensate for flattening during the later three-dimensional deformation of the metal layer. A blank having regularly patterned embossment size and distribution is not used in any case. Two complementary embossing forms, between which the planar starting metal sheet is laid, may be used in a way known per se to generate the embossments. To produce the embossments, stamps are pressed into corresponding cavities having the desired embossment shape or a larger stamping of the diametrically opposite embossing form. A similar shaping is also possible using deep-drawing.

Another possibility for embossment production comprises providing pins offset to one another on both diametrically opposite embossing forms. The pins of one form lie where the embossment apices are to be located in the metal layer. The pins of the other form are used as a kind of hold-down for the metal layer and are located in the intermediate spaces between the embossments. In this case of embossment production, embossments having relatively softly rising flanks and a relatively low degree of deformation of the material are produced. Taller pins typically also result in embossments having a greater area extension. The pins of one form are each situated staggered to the pins of the other form. Suitable pin diameters are in the range from 0.5 to 4 mm, in particular 1 to 3 mm. Their height is preferably 1 to 15 mm and especially preferably 1.5 to 8 mm. The spacing of the pins within a form is expediently between 2 and 30 mm, in particular 4 to 15 mm. The pins of the diametrically opposite form are preferably implemented precisely like those of the other form and are seated as exactly centrally as possible on gaps between the pins of the diametrically opposite form.

If the heat shield has a nonmetallic insulation layer, as in the prior art, it comprises, for example, mica or vermiculite, temperature-resistant cardboard, inorganic or organic fiber composite materials or other suitable insulation materials such as fabrics, warp knitted fabrics, and/or knitted fabrics made of temperature-resistant fibers.

The connection of the layers may also be performed in a typical way. For example, two metallic layers may be connected to one another via a fold in such a way that one layer has an excess in relation to the other layer and this excess is bent around the edge of the other layer. When the excess is bent around, a possibly present insulation layer is fixed between the two metallic layers. Examples are described in EP 1775437 A1 and DE 202007007453 U of the applicant.

The heat shield according to the invention may comprise a single part or multiple parts, in the latter case the various parts may be fastened to one another via screw and/or plug-in connections in particular. Plug-in connections are frequently implemented with the aid of clips. For heat shields formed from multiple parts, it may be sufficient, depending on the individual design, if only one single part has the embossment design according to the invention.

The heat shield according to the invention is typically used in the area of the internal combustion engine and exhaust system in motor vehicles. The heat shield may be used for shielding the exhaust manifold, the turbocharger, and add-on parts such as catalytic converter, precatalytic converter, particulate filter, or other components.

The embossments are partially shown in the partial figures in such a way that they are distributed on a pattern and diagonal lines could be drawn through multiple embossments. This simplification is solely for the sake of illustration. In the real heat shield, the embossments are preferably all situated in such a way that no continuous line may be drawn through the centers of gravity of multiple embossments. The offset configuration of the embossments ensures additional stiffening of the heat shield.

FIG. 1-a shows a detail of a single-layer heat shield 1 according to the invention. The heat shield comprises a metallic layer 2, which comprises hot-dip aluminized steel, for example. The heat shield 1 essentially has an asymmetrical saddle-like shape. The three-dimensional deformation was produced by embossing from a planar and flat blank. The heat shield 1 is, for example, a heat shield which is used in the area of an exhaust system of a motor vehicle. Fastener openings 5 are provided in the heat shield 1 for the fastening in this area, through which fastening screws are guided and screwed to the vehicle body, for example.

A plurality of closed embossments 3 is embossed in the metal layer 2. The embossments 3 all have a round shape here. The embossments 3 are distributed essentially uniformly over the area of the metal layer 2. Only in the outer edge area 10 of the heat shield 1 and in the edge area 12 around the fastener openings 5, no embossments are provided. The embossments 3 project beyond the surface 21. In the area of the surface 21 facing toward the observer and largely visible, the observer thus views the protrusions of the embossments, while he looks into the embossment depressions in the narrow strip at the upper image edge, which is visible from the surface 22.

As already recognizable in FIG. 1-a, the embossments 3 differ from one another in their size. Large embossments having a high section modulus are present in the areas of the metal layer 2 which are subjected to a strong bending stress. Such an area is recognizable, for example, approximately in the middle of the detail running essentially from top to bottom between the fastener openings 5. Significantly larger embossments are situated at a significantly greater density than in the other areas here. The size and density increases from the bottom up into the area of the saddle and then decreases again in the direction of the edge 15 pointing forward.

FIG. 1-b shows a detail from a two-layer heat shield 1, in which only the layer 2 is embossed. The layer 20, which points forward in the upper area of the illustration, only has the macroscopic three-dimensional deformations typical for a heat shield. In an area somewhat to the right of the middle, the embossments 3 in the layer 2 are oval-shaped, while in the remaining areas round embossments 3 of various sizes are used. The width B of these oval embossments is greater than the width B' of the adjacent embossments. The embossments are oriented in such a way that the greatest width B runs in the same direction as the lever forces of the bending stress engaging in this area on the metal layer 2. The embossment size decreases toward the outer edge. The embossments are preferably situated in the real heat shield in such a way that no continuous (straight) line course results between their center points. The heat shield is thus well protected against bending along a bending line running in a longitudinal direction. Its saddle-like shape protects the heat shield against bending in the transverse direction.

FIG. 1-c again shows a detail of single-layer heat shield 1, which has two flaps 23 pointing downward in the illustration in addition to a saddle-like shape. The transition areas from the saddle-like shape to the flaps have an especially high bending stress and are especially susceptible to deformation, even buckling. This is shown by the theoretical bending line 10. In its area and in proximity thereto, indicated by the oval 11, the heat shield has an especially high density of embossments 3, which have different sizes and shapes, because in this way continuous lines may be prevented especially easily from remaining between the protrusions, which come into consideration as potential buckling lines. A theoretical bending line 10', which is significantly shorter, however, also spans the area of the rounded corner 9 pointing up and to the left, which is also secured by providing oval embossments lying close to one another. The areas 12 around the fastener through openings 5 are not provided with embossments, like the areas 14 reinforced with the strongly pronounced rib structure. FIG. 1-c also demonstrates that the embossments are preferably provided in such a way that no regularity results.

Figure 2:
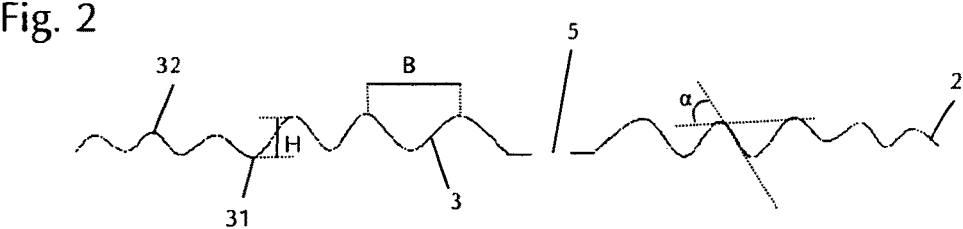
FIG. 2 shows a partial section of an area, provided with protrusions, of an exemplary embodiment of a single-layer heat shield according to the invention in the area of a fastener opening.

FIG. 2 shows a cross-section through a single-layer heat shield in the area of a fastener opening 5. It is recognizable here that the embossments 3 not only have different area extensions, but rather also different heights and flank steepness. The height H of the embossments (the greatest distance between embossment apex 31 and base point 32 of the embossment 3) increases with increasing bending stress in the heat shield. The flank steepness of the embossments 3 also changes. A greater flank angle $\alpha$ (between a tangent applied to the center of the flank and a straight line between diametrically opposite base points of the embossment) decreases the section modulus of the embossment and increases the ability to deform of the metal layer 3. By setting embossment height, embossment size, embossment width (area extension), and flank steepness in regard to the calculated bending stress over the area of the metal layer 2, the rigidity of the metal layer may be adapted in a targeted way to the requirements. The embossments are thus only exactly large enough as is necessary to obtain the required properties of the metal layer.

FIGS. 4 and 5 are to explain this procedure further. FIG. 4 shows a theoretical blank 2' of the metal layer 2. This is solely a model which is to be used for calculating the local bending stress over the area of the metal layer 2. This blank 2' does have the three-dimensional shape of the finished metal layer 2 already, but no embossments are shaped in. In addition, the calculation assumes a uniform material thickness. The particular local bending stress to be expected is calculated according to the bending beam theory on the basis of this blank according to the finite element method over the entire area of the blank. On the basis of the calculated local bending stress it is established in which areas of the metal layer 2 embossments have to be introduced so that the limit tension of the material of the metal layer 2 is not exceeded. The size of the required embossments is established according to these values. The higher the bending stress to be expected, the taller, wider, and steeper the embossments are designed.

The areas of lowest bending stress are identified by I in FIG. 4. The bending stress increases over the areas II and III up to the area IV, where the greatest bending stress exists. FIG. 5 schematically shows the result of establishing the embossment height in relation to the bending stress for the area along line A-A in FIG. 4. As may be seen, embossment height and width increase from the area I in the direction toward the area IV, where the greatest embossment height and width are present.

Figure 3:
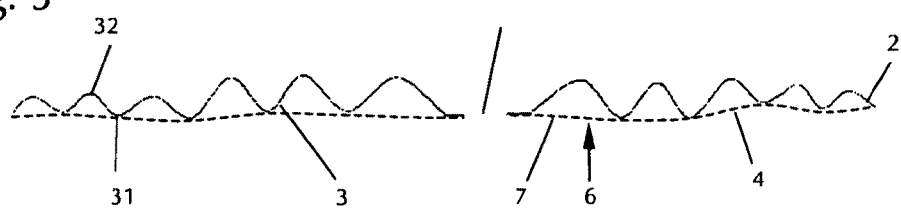
FIG. 3 shows a partial section through an area, provided with protrusions, of an exemplary embodiment of a two-layer heat shield according to the invention in the area of a fastener opening.

Finally, FIG. 3 shows another example of a two-layer heat shield. The detail shown corresponds to that of FIG. 2. In addition, however, a further metal layer 4 is provided here, which presses against the apices 31 of the embossments 3. The second metal layer 4 has a perforated area 6 provided with microholes 7, which extends here essentially over the entire detail shown. The microperforation allows the absorption of noise which is absorbed in the holes 7 and oscillates on an air column formed therein and is thus dissipated.

The invention claimed is:

1. A heat shield for shielding an object against heat and/or noise having at least one metal layer having a first and a second surface, beyond at least one of which a plurality of embossments projects, and fastener openings in said at least one metal layer, said fastener openings having edge areas where no embossments are provided, wherein at least a part of the embossments differ from the remaining embossments in their size, wherein the height and/or area extension and/or the flank steepness of the embossments decreases with local decreasing bending stress and increases with local increasing bending stress in the metal layer.

2. The heat shield according to claim 1, wherein the embossments differ in their height.

3. The heat shield according to claim 1, wherein the embossments differ in their area extension and/or their flank steepness.

4. The heat shield according to claim 1, wherein at least 30% of the area of the metal layer is provided with embossments.

5. The heat shield according to claim 1, wherein at least 40% of the area of the metal layer is provided with embossments.

6. The heat shield according to claim 1, wherein the size of the embossments is established in such a way that the limit tension of the metal layer is not exceeded at the location of application of the particular embossment.

7. The heat shield according to claim 6, wherein the limit tension is the tensile strength of the non-embossed, three-dimensionally shaped metal layer.

8. The heat shield according to claim 1, wherein the height and/or area extension and/or the flank steepness of the embossments increases with increasing bending stress.

9. The heat shield according to claim 1, wherein embossments are present in the areas of a bending stress of 50 to 500 N/mm$^2$ before the introduction of the embossments.

10. The heat shield according to claim 1, wherein embossments are present in the areas of a bending stress of 60 to 400 N/mm$^2$ before the introduction of the embossments.

11. The heat shield according to claim 1, wherein the bending stress is in a range from 60 to 300 N/mm$^2$ after the introduction of the embossments.

12. The heat shield according to claim 1, wherein the embossments have at least one of the following properties:
    a height of 1 to 15 mm,
    an area extension of 12 to 1300 mm$^2$,
    a diameter of 2 to 20 mm.

13. The heat shield according to claim 1, wherein the embossments have at least one of the following properties:
    a height of 2.5 to 15 mm in the range of a bending stress of 160 N/mm$^2$ to 500 N/mm$^2$,
    a height of 1 to 8 mm in the range of a bending stress of less than 120 N/mm$^2$,
    an area extension of 50 to 1300 mm$^2$ in the range of a bending stress of 160 N/mm$^2$ to 500 N/mm$^2$,
    an area extension of 12 to 200 mm$^2$ in the range of a bending stress of less than 120 N/mm$^2$,
    a diameter of 4 to 20 mm in the range of a bending stress of 160 N/mm$^2$ to 500 N/mm$^2$,
    a diameter of 2 to 8 mm in the range of a bending stress of less than 120 N/mm$^2$.

14. The heat shield according to claim 1, wherein the embossments have at least one of the following properties:
    a flank angle of 20 to 90° and
    a spacing of the embossment apices of 3 to 15 mm.

15. The heat shield according to claim 1, wherein at least a part of the embossments have a greater diameter in the direction of the bending stress than transversely to the bending stress.

16. The heat shield according to claim 1, wherein 1 to 10 embossments are provided per square centimeter of the second metal layer.

17. The heat shield according to claim 1, wherein it has a second metal layer having at least one perforated area, the embossments pointing in the direction toward the second metal layer and their apices pressing against the second metal layer.

18. The heat shield according to claim 1, wherein it has a second metal layer made of an unstructured sheet, the embossments pointing in the direction toward the second metal layer and their apices pressing against the second metal layer.

* * * * *